United States Patent [19]

Morimoto et al.

[11] Patent Number: 5,085,888
[45] Date of Patent: Feb. 4, 1992

[54] METHOD FOR FORMING THIN $MgF_2$ FILM AND LOW-REFLECTION FILM

[75] Inventors: Takeshi Morimoto; Yasuhiro Sanada, both of Yokohama, Japan

[73] Assignee: Asahi Glass Company Ltd., Tokyo, Japan

[21] Appl. No.: 598,640

[22] PCT Filed: Feb. 23, 1990

[86] PCT No.: PCT/JP90/00222
§ 371 Date: Dec. 11, 1990
§ 102(e) Date: Dec. 11, 1990

[30] Foreign Application Priority Data

Feb. 23, 1989 [JP] Japan ............................ 1-41862
Apr. 6, 1989 [JP] Japan ............................ 1-85740

[51] Int. Cl.⁵ .................................................. B05D 5/12
[52] U.S. Cl. ........................................ 427/108; 427/162; 427/165; 427/126.2; 427/226; 427/419.1
[58] Field of Search ............ 427/165, 226, 108, 126.2, 427/162, 419.1

[56] References Cited

U.S. PATENT DOCUMENTS

| | | | |
|---|---|---|---|
| 4,492,721 | 1/1985 | Joosten et al. | 427/165 |
| 4,579,638 | 4/1986 | Scherber | 427/39 |
| 4,681,819 | 7/1987 | Gnyra | 427/226 |
| 4,874,222 | 10/1989 | Vacha et al. | 427/163 |

FOREIGN PATENT DOCUMENTS 0125721 11/1984 European Pat. Off.

Primary Examiner—Janyce Bell
Attorney, Agent, or Firm—Oblon, Spivak, McCelland, Maier & Neustadt

[57] ABSTRACT

Disclosed herein is a method for forming a thin $MgF_2$ film on a substrate which comprises coating a substrate with a liquid containing an Mg salt and a $BF_3$ complex salt and subsequently heating the coating, and the method may be used to coat a substrate such as glass plate, optical parts, CRT panel and liquid crystal display panel with a low-reflection film composed of a transparent thin $MgF_2$ film having a low refractive index and good durability.

17 Claims, No Drawings

METHOD FOR FORMING THIN MGF₂ FILM AND LOW-REFLECTION FILM

TECHNICAL FIELD

The present invention relates to a method for forming on a substrate a transparent thin MgF2 film having a low refractive index and also to a method for forming a low-reflection film on a substrate.

BACKGROUND ART

There have been proposed many methods for forming a low-reflection film on a substrate in the field of cathode-ray tube for TV and computer terminals, not to mention sheet glass, optical parts and optical instruments.

Conventional methods consist of coating the surface of a cathode-ray tube with an $SiO_2$ layer having minute irregularities, thereby producing the anti-glare effect, or consist of etching the surface of a cathode-ray tube with hydrofluoric acid, thereby forming surface irregularities, as disclosed in Japanese Unexamined Patent Publication No. 118931/1986. The coating and etching by these conventional methods are called non-glare treatment because they merely form minute irregularities which reflect and scatter the incident light; they are not essentially designed to form a low-reflection film and hence they have a limit in decreasing the reflectivity of the substrate.

On the other hand, attempts have been made to coat the surface of lens or glass with a thin film of $MgF_2$ (which is a stable substance having a low refractive index) by vacuum deposition. Unfortunately, vacuum deposition has a disadvantage of requiring an expensive apparatus and involving difficulties in handling large objects (such as finished cathode ray tube and sheet glass) and a large number of objects for mass production. All this leads vacuum deposition to high production cost.

The present invention was completed to eliminate the above-mentioned disadvantages involved in the conventional technology. Accordingly, it is an object of the present invention to provide a new method for forming on a substrate a stable, transparent thin film having a low refractive index in a simple chemical manner. It is another object of the present invention to provide a new method for forming on a substrate a thin film having the low-reflection characteristics.

DISCLOSURE OF THE INVENTION

The first aspect of the present invention resides in a method for forming a thin $MgF_2$ film on a substrate which comprises coating a substrate with a liquid containing an Mg salt and a $BF_3$ complex salt and subsequently heating the coating.

The second aspect of the present invention resides in a method for forming on a substrate a low-reflection film of monolayer or multilayer structure, with at least one layer being a thin $MgF_2$ film, said process comprising coating a substrate with a liquid containing an Mg salt and a $BF_3$ complex salt and subsequently heating the coating, thereby forming said thin $MgF_2$ film.

The third aspect of the present invention resides in a method for forming on a substrate a thin $MgF_2$ film and low-reflection film which comprises coating a substrate with a solution containing an $MgF_2$ sol formed by the reaction between an Mg salt and a $BF_3$ complex salt, and subsequently heating the coating.

The fourth aspect of the present invention resides in a method for forming on a substrate a thin $MgF_2$ film and low-reflection film which comprises coating a substrate with a solution containing a silicon compound and an $MgF_2$ sol formed by the reaction between an Mg salt and a $BF_3$ complex salt, and subsequently heating the coat.

In the preferred embodiments of the present invention, the Mg salt is $MgX_2$ (X=a halogen element other than fluorine), and is used in combination with a $BF_3$ complex salt.

According to the method of the present invention, the thin $MgF_2$ film is formed from an Mg salt (excluding a fluoride) and a $BF_3$ complex salt which functions as a fluorinating agent. The reaction to form the thin $MgF_2$ film is promoted if the Mg salt and $BF_3$ complex salt as the starting materials are dispersed, mixed or dissolved in a solution, and the reaction rate is increased by heating.

The Mg salt as the starting material may be available in various forms such as those represented by the formula $MgX_2$ (where X denotes a halogen excluding fluorine). Preferred examples of the Mg salt include $MgCl_2$, $MgBr_2$ and $MgI_2$. Among these with $MgCl_2$ being most desirable. They may be in the form of either anhydride or hydrate. Other preferred examples of the Mg salt include hydroxide, carbonate, sulfate, nitrate, perchlorate and acetate. Additional preferred examples of the Mg salt include Mg alkoxides represented by the formula $Mg(OR)_2$ (where R denotes an alkyl group), organic acid salts including carboxylates (such as acetate, formate, oxalate and benzoate), and acetylacetone complex.

The $BF_3$ as the other starting material may be available in various forms. Preferred examples include $BF_3$ alkyl ether complex salt, $BF_3$ phenol complex salt, $BF_3$ alcohol complex salt and $BF_3$ aqueous solution complex salt. Typical examples include ethyl ether complex salt, methanol complex salt, ethanol complex salt, acetic acid complex salt and phenol complex salt. The solvent is not specifically limited, but it includes water, aqueous solution, alcohol, ester, ether and a high-dielectric organic solvent (such as propylene carbonate and γ-butyrolactone). Preferred solvents are alcohols, especially methanol, ethanol, propanol and butanol, which keep the starting materials stable.

The Mg salt and $BF_3$ complex salt should be used in a molar ratio of 1:2 to 4:1, especially 1:1 to 2:1. They should be dissolved in the solvent at a concentration of 1-30 wt %.

The solution from which the thin $MgF_2$ film is formed according to the method of the present invention may be prepared at room temperature. However, it is possible to accelerate the reaction by heating the solution up to a temperature below the boiling point of the solvent (e.g., up to about 100° C. in the case of alcohol). Time required for the reaction to form the $MgF_2$ sol ranges from 10 minutes to 6 hours, depending on the heating temperature. (For example, it is about 1 hour at the heating temperature of 85° C.)

It is possible to produce a solution which contains an $MgF_2$ sol having a desired particle diameter and particle size distribution, if Mg salt, $BF_3$ complex salt, concentration, solvent, heating temperature and reaction time are properly selected.

The solution prepared as mentioned above may be applied to a substrate. However, the solution may be filtered to remove the starting materials which remain undissolved. The solution may also be filtered to separate the $MgF_2$ powder which has been formed by the reaction, if it is necessary to mix the $MgF_2$ powder with another substance. In this case, the $MgF_2$ powder may be peptized again in a proper solvent using a ball mill, sand mill, homomixer or stirrer.

According to the present invention, the starting materials to form a thin $MgF_2$ film or the solution or sol containing $MgF_2$ may be incorporated with an additive, binder or filler, which increases the adhesion strength and hardness of the thin $MgF_2$ film or improves the stability of the solution or sol. Examples of the additive include $Si(OR)_4$ (R=alkyl group), $Si(OR)_x \cdot R_{x-4}$ (x=3 or 4, R=alkyl group), and partial hydrolyzate thereof, which cause $SiO_2$ to separate out during the reaction. Examples of the binder include, in addition to the above-mentioned silicon compounds, $Zr(OR)_4$ (R=alkyl group), $Ti(OR)_4$ (where R=alkyl group), $Al(OR)_3$ (R=alkyl group), $Zr(C_5H_7O_2)_n \cdot (OR)_m$ (n=1 to 4, m=0 to 3, n+m=4, R=alkyl group), $Ti(C_5H_7O_2)_n (OR)_m$ (n=1 to 4, m=0 to 3, n+m=4, R=alkyl group), $Al(C_5H_7O_2)_n \cdot (OR)_m$ (n=1 to 3, m=0 to 2, n+m=3, R=alkyl group), $Zr(OR)_x \cdot R_{4-x}$ (x=1 to 3, R=alkyl group), $Ti(OR)_x \cdot R_{4-x}$ (x=1 to 3, R=alkyl group), $Al(OR)_x R_{3-x}$ (x=1 or 2, R=alkyl group), and partial hydrolyzate thereof, which cause $ZrO_2$, $TiO_2$ and $Al_2O_3$ to separate out individually or in the form of mixture or complex together with $MgF_2$, $MgF_2$ and $SiO_2$. Moreover, the solution may be incorporated with a proper surface active agent to improve its ability to wet the substrate. Examples of the surface active agent include sodium linear alkylbenzenesulfonate and alkyl ether sulfate ester.

For the thin $MgF_2$ film to have electrical conductivity, it is necessary to incorporate an electroconductive metal compound into the solution containing an Mg salt and a $BF_3$ complex salt (and an optional compound which forms at least one kind of $SiO_2$, $ZrO_2$, $TiO_2$ and $Al_2O_3$). Examples of the metal compound include the organic salts (such as acetylacetonate and alkoxide) and inorganic salts (such as halide, acetate, nitrate and chelate) of metals (such as Sn and In) which form electrically conductive metal oxides (such as $SnO_2$ and $In_2O_3$ containing Sn (ITO)). These metal compounds give rise to an electrically conductive metal oxide such as $SnO_2$ and Sn-containing $In_2O_3$ (ITO) simultaneously with the separation of $MgF_2$, and $MgF_2$ other oxides.

The metal compound to impart electrical conductivity may be replaced by a separately prepared colloid solution containing fine powder of electrically conductive oxide such as Sb-$SnO_2$ (Sb-doped $SnO_2$), $SnO_2$, F-doped $SnO_2$ or ITO.

According to the present invention, the thin $MgF_2$ film is formed from a solution containing an Mg salt and $BF_3$ complex salt or a solution containing $MgF_2$ sol which is applied to a substrate. If the solution is of the types of low-boiling solvent, it affords a uniform $MgF_2$ film after drying at room temperature. However, if the solution is of the types of high-boiling solvent, or if it is desirable to increase the strength of the film, the substrate may be heated after coating. The heating temperature has an upper limit which is determined according to the softening point of glass or plastics used as the substrate.

The heating temperature should be higher than 50° C., preferably in the range of 100° to 500° C.

The solution can be applied to the substrate by spin coating, dipping, spraying, roll coating or meniscus coating. Spin coating is desirable because of its ability to form uniform film invariably in mass production. It will form an $MgF_2$ film having a thickness of 0.01 to 1 μm.

The present invention places no limit on the substrate on which is formed an $MgF_2$ film or low-reflection film containing $MgF_2$. It may be selected, according to the intended use, from glass (such as soda lime silicate glass, aluminosilicate glass, borosilicate glass, lithium aluminosilicate glass and quartz glass), transparent ceramics (such as single crystal of corundum, magnesia and sialon), and plastics (such as polycarbonate). In other words, the $MgF_2$ film or the low-reflection film containing $MgF_2$ may be formed on the front plate or front panel of an anti-reflection glass plate, lens, CRT panel, copy board for duplicating machine, instrument panel, clean room glass, CRT or LCD display panel, EC display panel, etc.

The method for forming a thin $MgF_2$ film may be used to form a multilayer low-reflection film containing an $MgF_2$ film. The multilayer low-reflection film having the anti-reflection performance may be typically made up of two layers, three layers or four layers. The two-layer low-reflection film is made up of a high-refraction layer —low-refraction layer ($\lambda/2$–$\lambda/4$ or $\lambda/4$–$\lambda/4$ optical thickness), arranged on top of the other, with the first layer being adjacent to the substrate ($\lambda$ represents the wavelength of the light to be kept from reflection). The three-layer low-reflection film is made up of a medium-refraction layer—high-refraction layer—low-refraction layer ($\lambda/4$–$\lambda/2$–$\lambda/4$ optical thickness), arranged on top of the other, with the first layer being adjacent to the substrate. The four-layer low-reflection film is made up of a low-refraction layer—medium-refraction layer—high-refraction layer—low-refraction layer ($\lambda/4$–$\lambda/4$–$\lambda/2$–$\lambda/4$ optical thickness), arranged on top of the other, with the first layer being adjacent to the substrate. In the present invention, it is possible to produce a multilayer low-reflection film in which the outermost layer or the inner low-refraction layer is the $MgF_2$ film (n=1.38).

The multilayer low-reflection film may contain a low-refraction layer which is made of an $MgF_2$ sol incorporated with a compound of silicon, zirconium, titanium or aluminum. This compound increases the strength and hardness of the low-refraction layer. Incidentally, the medium- and high-refraction layers in the multilayer low-reflection film may be made of any material which is not specifically limited. Examples of the known materials include $SnO_2$, $ZrO_2$, $TiO_2$, $CeO_2$ and ITO, which may be used alone or in combination with one another.

In the case where the multilayer low-reflection film contains a layer made of Sb- or F-doped $SnO_2$ or ITO, it exhibits antistatic properties owing to the low resistance of the material used. In the case of a low-reflection film of double-layer structure, the high-refraction layer (adjacent to the substrate) will exhibit antistatic properties if it is made from a colloid solution of Sb-doped $SnO_2$ which is incorporated with $Ti(C_5H_7O_2)_n \cdot (OR)_m$ (n=0 to 4, m=0 to 4, and n+m=4, R=alkyl group) or a partial hydrolyzate thereof in an amount necessary for the ratio of Sb-$SnO_2$ to $TiO_2$ to be from 1:9 to 9:1 by weight. The colloid solution may be incorporated with a silicon compound for the improvement of strength.

The anti-static low-reflection film having electrical conductivity may have the multilayer structure of substrate/$SnO_2$/$MgF_2$ or substrate/ITO/$MgF_2$. (Note that one of the layers is made of a transparent, electrically conductive material.) When formed on the CRT panel, it will prevent the CRT panel from becoming charged with static electricity and hence prevent the CRT panel from attracting dust and generating an electric discharge between the CRT panel and the human body.

The thin film containing an $MgF_2$ layer will have an increased strength and hardness if it is of multilayer structure of substrate/$SnO_2$/$MgF_2$-$SiO_2$ or monolayer structure of substrate/$MgF_2$-$SiO_2$ or substrate/$MgF_2$-$SiO_2$-$SnO_2$. The latter has an advantage of being formed by a single application.

Incidentally, the above-mentioned $MgF_2$ sol solution may be applied to the surface of a substrate, by spraying or the like which is followed by heating, to form an anti-glare film with minute surface irregularities. In this case, the anti-glare film may be formed on an electrically conductive layer, or the $MgF_2$ sol solution may be incorporated with $SnO_2$ or $In_2O_3$ to impart antistatic properties to the film.

The method of the present invention involves the reaction between an Mg salt and a $BF_3$ complex salt, with the latter functioning as a fluorinating agent. In the case where the Mg salt is $MgCl_2$, the reaction proceeds as follows to form an $MgF_2$ film.

$$3MgCl_2 + 2BF_3 \rightarrow 3MgF_2 + 2BCl_3 \uparrow$$

The $BCl_3$ in the right side might partly remain in the form of oxide in the film; but hardly affects the properties of the film. Likewise, the reactants in the left side might partly remain unreacted; but they hardly affect the properties of the film.

As mentioned above, the present invention provides a method for forming on a substrate a durable $MgF_2$ film or a durable low-reflection film containing an $MgF_2$ film. The method is simple and efficient. That is, it consists of coating a substrate, by spraying, spin coating or dipping, with a solution containing $MgF_2$ formed by the reaction between an Mg salt and a $BF_3$ complex salt, or with a solution containing $MgF_2$ sol. In the case where the substrate is glass, the coating of the solution may be heated so that a more durable thin $MgF_2$ film is formed on the substrate.

The method of the present invention permits high productivity and yet needs only a simple equipment without vacuum system. It can be used for the coating of large substrates such as CRT panels and glass plates for mass production. Thus, the present invention is of great industrial value.

BEST MODE FOR CARRYING OUT THE INVENTION

The invention will be described in more detail with reference to the following Examples.

EXAMPLE 1

A solution was prepared by dissolving $MgCl_2$ and $BF_3 \cdot CH_3OH$ complex salt in a molar ratio of 3:2, with the total amount of the two solutes in the solution being 5 wt%.

This solution was applied by dipping to a glass plate (as a substrate), which subsequently underwent spinning at 3000 rpm on a spin coater. The coated glass plate was heated at 250° C. in the air for 30 minutes. Thus, there was obtained a specimen having a 960 Å thick $MgF_2$ layer. This specimen was tested for reflectance of light having a wavelength of 360-700 nm.

EXAMPLE 2

The same procedure as in Example 1 was repeated except that the heating temperature was changed to 150° C. Thus there was obtained a specimen having a 1150 Å thick $MgF_2$ layer. This specimen was tested in the same manner as in Example 1.

EXAMPLE 3

The same procedure as in Example 1 was repeated except that the solvent was replaced by a 1:1 mixture of methanol and butanol (by volume). Thus there was obtained a specimen having a 1000 Å thick $MgF_2$ layer. This specimen was tested in the same manner as in Example 1.

EXAMPLE 4

The same procedure as in Example 1 was repeated except that the speed of the spin coater was changed to 300 rpm. Thus there was obtained a specimen having a 1200 Å thick $MgF_2$ layer. This specimen was tested in the same manner as in Example 1.

EXAMPLE 5

In a 1:1 mixture of methanol and water (by volume) were dissolved 2 wt% of $SnCl_4$ and 0.2 wt% of $SbCl_3$. This solution was applied by dipping to a glass plate, which subsequently underwent spinning at 3000 rpm on a spin coater. The coated glass plate was heated at 400° C. in the air for 30 minutes. Thus there was formed a 1100 Å thick $SnO_2$ layer on the glass plate. On the $SnO_2$ layer was formed a 960 Å thick $MgF_2$ layer in the same manner as in Example 1. The resulting specimen was tested in the same manner as in Example 1.

EXAMPLE 6

In 100 g of ethanol, 3 g of $H_2O$, 0.05 mol of $MgCl_2 \cdot 6H_2O$, and 0.033 mol of $BF_3$.ethanol complex salt were dissolved. The solution was refluxed at 85° C. for 1 hour to give an $MgF_2$ sol. To the solution containing $MgF_2$ sol, an ethanol solution of silicon ethoxide was added so that the resulting solution contains 3 wt% of solids in the form of oxides and also contains $MgF_2$ and $SiO_2$ in a ratio of 3:7.

To this solution, an ethanol solution of $Zr(C_5H_7O_2)_2.(C_4H_9O)_2$ in an amount equivalent (in terms of $ZrO_2$) to 10 wt% of $SiO_2$ was further added. The resulting solution was applied to a glass plate substrate by spin coating at 3000 rpm. The coated glass plate was heated at 200° C. in air for 30 minutes. Thus there was formed on the glass plate a 950 Å thick $MgF_2$ layer containing $ZrO_2$ and $SiO_2$. The thus obtained specimen was tested for reflectance of light having a wavelength of 360–700 nm.

COMPARATIVE EXAMPLE 1

The same glass plate substrate as used in Example 1, but untreated, was tested as such in the same manner as in Example 1.

The reflectance measured at a wavelength of 520 nm with regard to in Examples 1 to 5 and Comparative Example 1 are shown in Table 1 below.

TABLE 1

| Example No. | Reflectance (%) |
| --- | --- |
| Example 1 | 1.4 |
| Example 2 | 2.0 |
| Example 3 | 1.5 |
| Example 4 | 1.9 |
| Example 5 | 1.2 |
| Example 6 | 1.8 |
| Comparative Example 1 | 4.5 |

EXAMPLE 7

In 100 g of ethanol, 0.05 mol of $MgCl_2 \cdot 6H_2O$ and 0.033 mol of $BF_3$·ethanol complex salt were dissolved. The solution was reacted in a flask with a refluxing cooler at 85° C. for 1 hour to give an $MgF_2$ sol, followed by cooling to room temperature. The resulting solution was applied to a glass plate substrate by spin coating at 3000 rpm. The coated glass plate was heated at 200° C. in air for 30 minutes. Thus there was formed on the glass plate a 950 Å thick $MgF_2$ layer. The thus obtained specimen was tested for single-sided reflectance of light at a wavelength of 360–700 nm, surface resistance and strength.

EXAMPLE 8

The same procedure as in Example 7 was repeated except that the heating temperature was changed to 150° C. Thus there was obtained a specimen having a 1150 Å thick $MgF_2$ layer. This specimen was tested in the same manner as in Example 7.

EXAMPLE 9

The same procedure as in Example 7 was repeated except that the glass plate was coated with a mixture of the reaction solution of Example 7 (20 g) and an ethanol solution (20 g) containing 3 wt% of $Si(OC_2H_5)_4$ in terms of $SiO_2$. Thus there was obtained a specimen having a 1050 Å thick $MgF_2$-$SiO_2$ layer. This specimen was tested in the same manner as in Example 7.

EXAMPLE 10

The same procedure as in Example 7 was repeated except that the glass plate was coated with a mixture of the reaction solution of Example 7 (10 g), an ethanol solution (10 g) containing 3 wt% of $Si(OC_2H_5)_4$ in terms of $SiO_2$, and an ethanol solution (10 g) containing 3 wt% of $Sb(OC_2H_5)_3$-$Sn(OC_2H_5)_4$ (Sb=15 mol% of Sn) in terms of Sb-$SnO_2$. Thus there was obtained a specimen having a 1000 Å thick $MgF_2$-$SiO_2$-Sb-$SnO_2$ layer. This specimen was tested in the same manner as in Example 7.

EXAMPLE 11

In a 1:1 mixture of methanol and water (by volume), $SnCl_4$ and $SbCl_3$ were dissolved such that the solution contained 3 wt% of solutes in terms of Sb-$SnO_2$, with the ratio of Sb to Sn being 15 mol%. The resulting solution was applied to a glass plate substrate by spin coating at 3000 rpm. The coated glass plate was heated at 400° C. in the air for 30 minutes. Thus there was formed on the glass plate a 1100 Å thick Sb-$SnO_2$ layer. On this layer was further formed a 950 Å thick $MgF_2$ layer in the same manner as in Example 7. Thus there was obtained a specimen having a glass/Sb-$SnO_2$/$MgF_2$ structure in the same manner as in Example 7. The thus obtained specimen was tested in the same manner as in Example 7.

EXAMPLE 12

On a glass plate substrate was formed a 1100 Å thick Sb-$SnO_2$ layer in the same manner as in Example 11. On the Sb-$SnO_2$ layer was further formed a 1050 Å thick $MgF_2$-$SiO_2$ layer in the same manner as in Example 9. Thus there was obtained a specimen having a glass/Sb-$SnO_2$/$MgF_2$-$SiO_2$ structure in the same manner as in Example 7. The thus obtained specimen was tested in the same manner as in Example 7.

EXAMPLE 13

The same procedure as in Example 7 was repeated except that the glass plate was coated with a mixture of the reaction solution of Example 7 (10 g) and an ethanol solution (10 g) containing 3 wt% of fine $SnO_2$ powder doped with 15 mol% of Sb (having an average particle diameter of 0.02 μm). Thus there was obtained a specimen having a 1000 Å thick $MgF_2$-Sb-$SnO_2$ layer. This specimen was tested in the same manner as in Example 7.

EXAMPLE 14

The same procedure as in Example 7 was repeated except that the glass plate was coated with a mixture of the reaction solution of Example 7 (10 g), an ethanol solution (10 g) containing 3 wt% of fine $SnO_2$ powder doped with 15 mol% of Sb (having an average particle diameter of 0.02 μm), and an ethanol solution (10 g) containing 3 wt% of $Si(OC_2H_5)_4$ in terms of $SiO_2$. Thus there was obtained a specimen having a 1050 Å thick $MgF_2$-Sb-$SnO_2$-$SiO_2$ layer. This specimen was tested in the same manner as in Example 7.

EXAMPLE 15

A first coating solution was prepared from the following components.

20 g of ethanol solution containing 3 wt% of fine $SnO_2$ powder doped with 15 mol% of Sb (having an average particle diameter of 0.02 μm).

10 g of ethanol-water solution containing 3 wt% (in terms of $TiO_2$ solids) of partial hydrolyzate of $Ti(C_5H_7O_2)_2 \cdot (OC_4H_9)_2$.

2 g of ethanol-water solution containing 3 wt% (in terms of $ZrO_2$ solids) of partial hydrolyzate of $Zr(C_5H_7O_2)_2 \cdot (OC_4H_9)_2$.

The coating solution was applied to a glass plate substrate by spin coating at 1500 rpm. The coated glass plate was heated at 200° C. in air for 30 minutes. Thus there was formed on the glass plate a 1100 Å thick Sb-$SnO_2$-$TiO_2$-$ZrO_2$ layer.

A second coating solution was prepared from the following components.

12 g of the reaction solution obtained in Example 7.

18 g of ethanol-water-HCl solution containing 3 wt% (in terms of $SiO_2$ solids) of partial hydrolyzate of $Si(OC_2H_5)_4$.

1.8 g of ethanol-water solution containing 3 wt% (in terms of $ZrO_2$ solids) of partial hydrolyzate of $Zr(C_5H_7O_2)_2 \cdot (OC_4H_9)_2$.

The second coating solution was applied onto the Sb-$SnO_2$-$TiO_2$-$ZrO_2$ layer by spin coating at 2000 rpm, followed by heating at 200° C. in air for 30 minutes. Thus there was formed a 1000 Å thick $MgF_2$-$SiO_2$-$ZrO_2$ layer.

Thus there was obtained a specimen having a double-layer film composed of a substrate/Sb-$SnO_2$-$TiO_2$-

$ZrO_2$ layer/$MgF_2$-$SiO_2$-$ZrO_2$ layer structure. This specimen was tested in the same manner as in Example 7.

COMPARATIVE EXAMPLE 2

The same glass plate substrate as used in Example 7, but untreated, was tested as such in the same manner as in Example 7.

The results in Examples 7 to 15 and Comparative Example 2 are shown in Table 2 below.

TABLE 2

| Example No. | Reflectance (%) | Surface resistance ($\Omega/\square$) | Strength |
| --- | --- | --- | --- |
| Example 7 | 0.7 | $7 \times 10^{12}$ | Δ |
| Example 8 | 1.0 | $7 \times 10^{12}$ | Δ |
| Example 9 | 1.1 | $6 \times 10^{10}$ | ○ |
| Example 10 | 1.2 | $4 \times 10^{8}$ | ○ |
| Example 11 | 0.6 | $1 \times 10^{9}$ | Δ |
| Example 12 | 1.4 | $8 \times 10^{8}$ | ○ |
| Example 13 | 1.3 | $8 \times 10^{7}$ | Δ |
| Example 14 | 1.4 | $2 \times 10^{8}$ | ○ |
| Example 15 | 0.7 | $8 \times 10^{7}$ | ○ |
| Comparative Example 1 | 4.5 | $>10^{12}$ | — |

The measurement method is as follows:

Reflectance: measured for light having a wavelength of 520 nm using an automatic spectrophotometer made by Shimadzu Seisakusho Ltd.

Surface resistance: measured using a surface resistance meter. In Examples 5, 6, 10, 11–14, the surface resistance is that of the two layers in combination.

Strength: rated depending on whether the coating film suffered visible scratches when rubbed up to 100 times with a rubber eraser (No. 50–50 made by Lion Jimuki Co., Ltd.) under a load of 1 kg.

X Peeling of a film (visible scratches on the glass plate) occurred within 50 times rubbing;

ΔPeeling of a film occurred in 50 to 100 time rubbings; and

○Peeling of a film not occurred even after 100 time rubbings.

We claim:

1. A method for forming a thin $MgF_2$ film on a substrate, which comprises coating a substrate with a liquid containing an Mg salt and a $BF_3$ complex salt and subsequently heating the coating to form a film $MgF_2$ film.

2. The method for forming a thin $MgF_2$ film according to claim 1, which comprises coating a substrate with a liquid containing an $MgX_2$ (X=a halogen element other than fluorine) and a $BF_3$ complex salt and subsequently heating the coating.

3. The method for forming a thin $MgF_2$ film according to any of claims 1 and 2, wherein the $BF_3$ complex salt is at least one kind selected from $BF_3$ alkyl ether complex salt, $BF_3$ phenol complex salt, $BF_3$ alcohol complex salt and $BF_3$ aqueous solution complex salt.

4. A method for forming on a substrate a thin $MgF_2$ film, which comprises coating a substrate with a liquid containing an $MgF_2$ sol formed by the reaction between an Mg salt and a $BF_3$ complex salt, and subsequently heating the coating.

5. The method for forming a thin $MgF_2$ film according to claim 4, which comprises coating a substrate with a liquid containing an $MgF_2$ sol formed by the reaction between an Mg salt and a $BF_3$ complex salt and silicon compound incorporated therein, and subsequently heating the coating.

6. The method for forming a thin $MgF_2$ film according to claim 4 and claim 5, which comprises coating a substrate with a liquid containing an $MgF_2$ sol formed by the reaction between an Mg salt and a $BF_3$ complex salt and being incorporated with a fine powder of electrically conductive oxide or a metal salt which forms a fine powder of electrically conductive oxide, and subsequently heating the coating.

7. The method for forming a thin $MgF_2$ film according to any of claims 4 and 5, wherein the Mg salt is at least one kind of salts selected from halides expressed by the general formula $MgX_2$ (X=a halogen element other than fluorine).

8. The method for forming a thin $MgF_2$ film according to claim 4, which comprises coating a substrate with a mixture of a liquid containing an $MgF_2$ sol formed by the reaction between an Mg salt and a $BF_3$ complex salt with a liquid containing at least one kind selected from silicon compound, zirconium compound, titanium compound, aluminum compound and tin compound, and subsequently heating the coating.

9. A method for forming on a substrate a low-reflection film of monolayer or multilayer structure, with at least one layer being a thin $MgF_2$ film, said process comprising coating a substrate with a liquid containing an Mg salt and a $BF_3$ complex salt and subsequently heating the coating.

10. A method for forming on a substrate a low-reflection film of monolayer or multilayer structure, with at least one layer being a thin $MgF_2$ film, said process comprising coating a substrate with a liquid containing an $MgF_2$ sol formed by the reaction between an Mg salt and a $BF_3$ complex salt, and subsequently heating the coating.

11. The method for forming on a substrate a low-reflection film according to any of claim 9 and claim 10, wherein the $BF_3$ complex salt is at least one kind selected from $BF_3$ alkyl ether complex salt, $BF_3$ phenol complex salt, $BF_3$ alcohol complex salt and $BF_3$ aqueous solution complex salt.

12. The method for forming on a substrate a low-reflection film of monolayer or multilayer structure, with at least one layer being a thin $MgF_2$ film, according to claim 9, wherein the thin $MgF_2$ film is formed by coating a substrate with a liquid containing an $MgX_2$ salt (X=a halogen element other than fluorine) and a $BF_3$ complex salt, and subsequently heating the coating.

13. The method for forming on a substrate a low-reflection film of monolayer or multilayer structure, with at least one layer being a thin $MgF_2$ film, according to claim 10, wherein the thin $MgF_2$ film is formed by coating a substrate with a liquid containing an $MgF_2$ sol formed by the reaction between an Mg salt and a $BF_3$ complex salt, and subsequently heating the coating.

14. The method for forming on a substrate a low-reflection film of monolayer or multilayer structure, with at least one layer being an $MgF_2$-containing film, according to claim 9, wherein the $MgF_2$-containing film is formed by coating a substrate with a mixture of a liquid containing an Mg salt and a $BF_3$ complex salt with a liquid containing at least one kind selected from silicon compound, zirconium compound, titanium compound, aluminum compound and tin compound, and subsequently heating the coating.

15. The method forming on a substrate a low-reflection film of monolayer or multilayer structure, with at least one layer being an $MgF_2$-containing film, according to claim 10, wherein the $MgF_2$-containing film is formed by coating a substrate with a mixture of a liquid containing an $MgF_2$ sol formed by the reaction between an Mg salt and a $BF_3$ complex salt and a liquid containing at least one kind selected from silicon compound, zirconium compound, titanium compound, aluminum compound and tin compound, and subsequently heating the coating.

16. The method for forming on a substrate an electroconductive low-reflection film of at least two layer structure, according to claim 9, which comprises forming a transparent electroconductive film on a substrate, coating thereon a liquid containing an MgX (X=a halogen element other than fluorine) salt and a $BF_3$ complex salt, and subsequently heating the coating to form a thin $MgF_2$ film.

17. The method for forming on a substrate an electroconductive low-reflection film of at least two layer structure, according to claim 10, which comprises forming a transparent electroconductive film on a substrate, coating thereon a liquid containing an $MgF_2$ sol formed by the reaction between an Mg salt and a $BF_3$ complex salt, and subsequently heating the coating to form a thin $MgF_2$ film.

* * * * *